United States Patent
Harris et al.

(10) Patent No.: US 7,158,806 B2
(45) Date of Patent: Jan. 2, 2007

(54) DISPATCH CALL SETUP METHOD

(75) Inventors: John M. Harris, Chicago, IL (US); Ronald T. Crocker, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 494 days.

(21) Appl. No.: 10/349,728

(22) Filed: Jan. 22, 2003

(65) Prior Publication Data

US 2004/0142713 A1 Jul. 22, 2004

(51) Int. Cl.
*H04Q 7/20* (2006.01)
*H04L 12/16* (2006.01)
*H04J 15/00* (2006.01)

(52) U.S. Cl. .................. 455/519; 455/517; 455/518; 455/521

(58) Field of Classification Search ............... 455/517, 455/518, 519, 520, 521, 416, 574, 343.1; 370/260, 202.1, 312
See application file for complete search history.

(56) References Cited

U.S. PATENT DOCUMENTS

| | | | | |
|---|---|---|---|---|
| 5,001,776 A | * | 3/1991 | Clark | 455/226.2 |
| 5,369,798 A | * | 11/1994 | Lee | 455/434 |
| 5,566,366 A | * | 10/1996 | Russo et al. | 455/343.5 |
| 5,726,636 A | * | 3/1998 | Hayes, Jr. | 340/636.1 |
| 5,884,196 A | * | 3/1999 | Lekven et al. | 455/574 |
| 6,041,241 A | * | 3/2000 | Willey | 455/574 |
| 6,184,654 B1 | * | 2/2001 | Bachner et al. | 320/114 |
| 6,236,674 B1 | * | 5/2001 | Morelli et al. | 375/219 |
| 6,275,712 B1 | * | 8/2001 | Gray et al. | 455/522 |
| 6,339,713 B1 | * | 1/2002 | Hansson et al. | 455/574 |
| 6,636,745 B1 | * | 10/2003 | Oprescu-Surcobe et al. | 455/458 |
| 6,696,922 B1 | * | 2/2004 | Wong et al. | 340/7.32 |
| 6,714,795 B1 | * | 3/2004 | Long et al. | 455/518 |
| 6,725,053 B1 | * | 4/2004 | Rosen et al. | 455/518 |
| 2003/0195019 A1 | * | 10/2003 | Litwin | 455/574 |
| 2004/0002366 A1 | * | 1/2004 | Cromer et al. | 455/574 |

* cited by examiner

*Primary Examiner*—Tilahun Gesesse
(74) *Attorney, Agent, or Firm*—Frank J. Bogacz; Kevin D. Wills

(57) ABSTRACT

A call setup method (50) makes an early detection if a mobile call is to be placed (52). The mobile unit (10) then checks to insure that the battery life of the mobile unit is above a threshold level (56). If the battery level is sufficient, the mobile unit begins an early scan for an RF acquisition message (60).

16 Claims, 2 Drawing Sheets

DISPATCH CALL SETUP METHOD

BACKGROUND OF THE INVENTION

The present invention pertains to mobile packet data networks and more particularly to call setup methodology for dispatch data, data, and interconnect calls.

In wireless communication systems, mobile units or devices are required to operate on batteries and these mobile units will go inactive on the RF (radio frequency) channels (or dormant) after a short period of inactivity of usage for data services, usually 30 to 60 seconds. Therefore, in dispatch data, interconnect and data calls using wireless data services, both the originating and terminating mobile units must be transitioned to the active state (actually using RF resources) as part of the call setup prior to enabling the data transfer function. Once a mobile unit is in the active state, an RF (radio frequency) channel has been established and the mobile unit is able to transmit and/or receive data.

When a mobile unit is in the active state, it consumes significant amounts of RF capacity even if the user is not actually engaged in a data transfer function, as is the case when the mobile unit is in the state after the last data transfer function but before the period of inactivity has expired. These RF costs are due to overhead from power control, and in some cases dedicated pilot. When a mobile unit is in particularly good RF locations, as indicated by the Ec/Io or pilot signal strength that they detect, it will consume significantly less RF resources when it is active (on an RF channel) than will one in a bad RF location (i.e. with a poor Ec/Io).

For typical dispatch call applications, the time required for transitioning an originating mobile unit from a dormant state to the active state can be greater than 3 seconds in current implementations. An equal or greater amount of time is required to transition the terminating mobile unit from the dormant to active state, including additional time to actually page the terminating mobile unit, as is known in the art. These times do not include transmission time over the air or call processing time required by the dispatch servers. As a result, for the push-to-talk function total delay times experienced by the originating mobile unit may be 10 seconds or greater.

With long call setup times, the advantages of the dispatch service as an instant communication method is diminished. In fact, call setup times of 8 seconds or even longer may make the service non-viable in the marketplace. For example, users would prefer to use cellular (interconnect), rather than holding down the PTT button.

Accordingly, it would be highly desirable to have a method for substantially decreasing the call setup time for calls within a packet data network configuration.

DESCRIPTION OF THE PREFERRED EMBODIMENT OF THE INVENTION

The techniques to improve the setup time fall into two categories, those that improve the time for the originators mobile device to be activated on the RF network, and those that improve the time for the target user mobile device to be activated on the RF network.

The key to making dispatch call applications in a 3G environment successful is a fast call setup time. If the time required to transition a mobile unit from dormant to active state cannot be reduced, it may be able to be minimized and hidden from the user. The mobile unit may take prospective action (speculation) based upon actions of the originating mobile user. Such actions of the originating mobile user may include selection of the phone book directory of the mobile unit, selecting a target caller to call or creating a group for a group call, or other actions on the mobile device such as selecting the dispatch function in a menu, opening the cover of the phone, or even removal of the mobile device from its holster.

The above actions are recognized by the operating software of the originating mobile unit 10 and cause the originating mobile unit to take prospective action of transitioning the originating mobile unit from a dormant to an active state.

Figure 1:
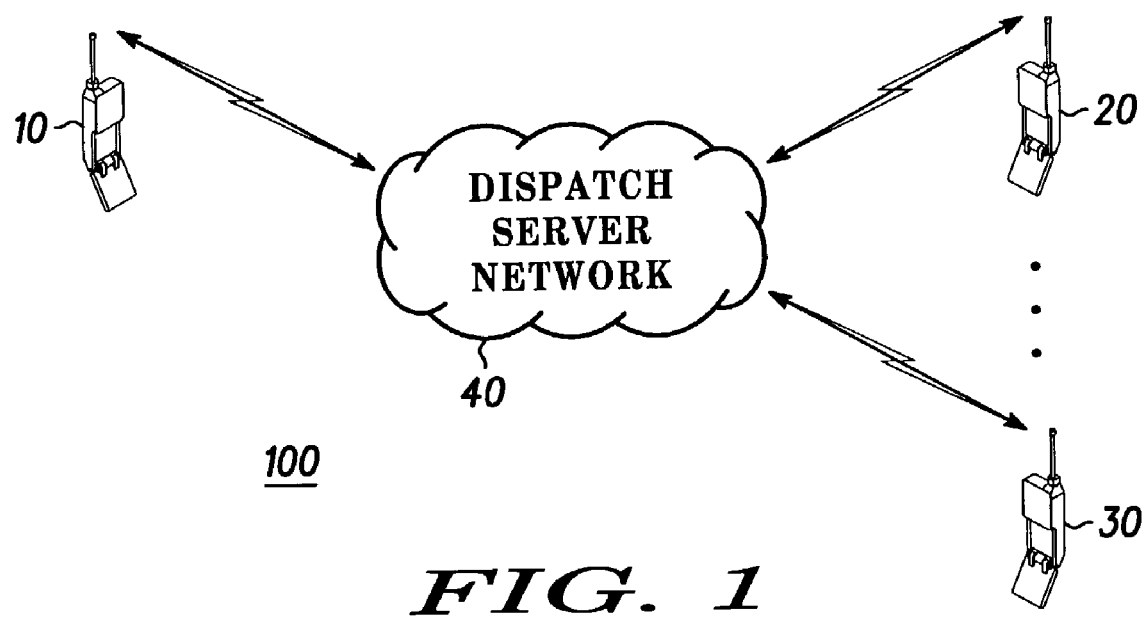
FIG. 1 is a block diagram of a packet data network dispatch server for supporting private and group calls in accordance with the present invention.
Figure 2:
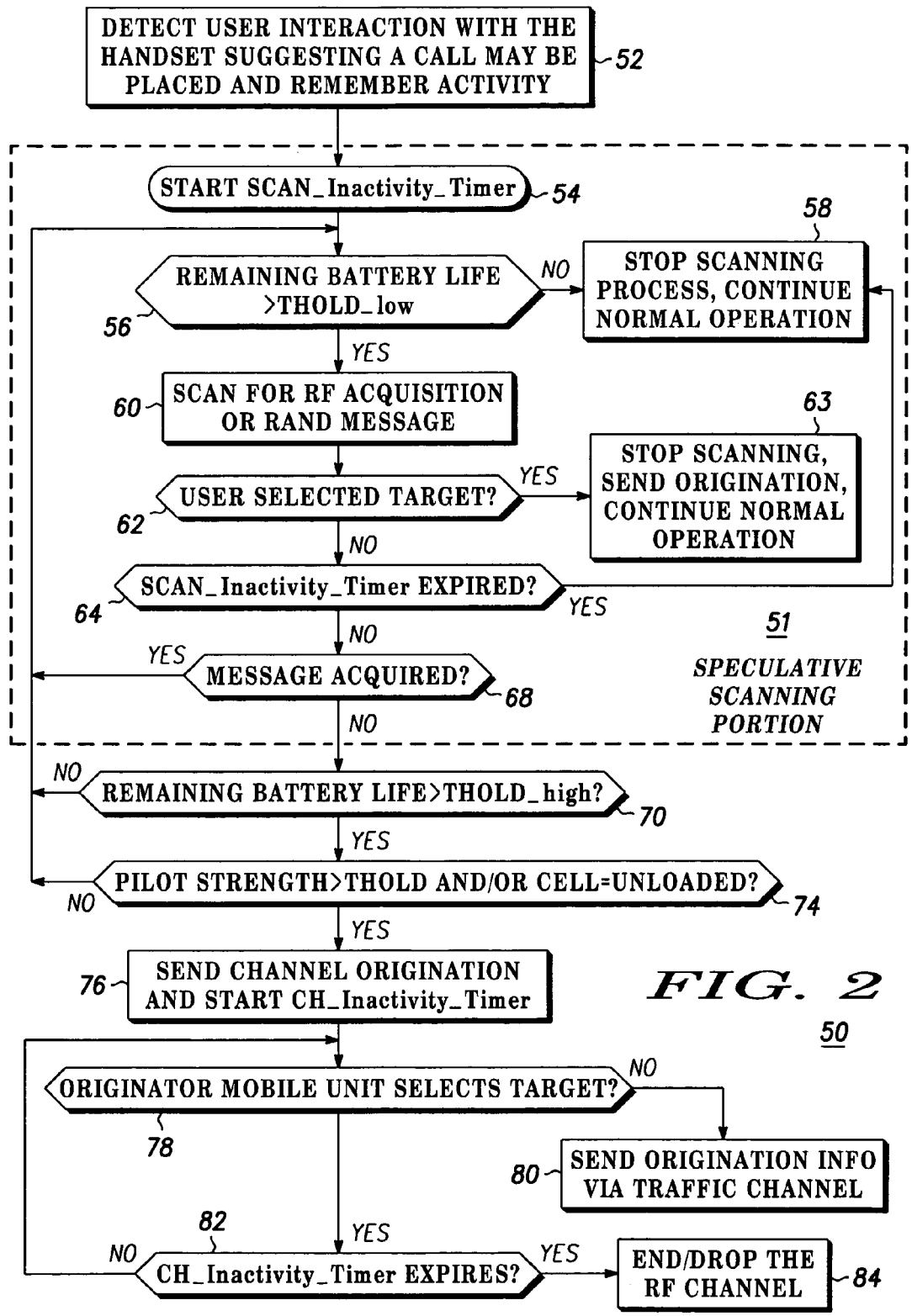
FIG. 2 is a call flow diagram of a dispatch or interconnect call in accordance with the present invention.

Referring to FIG. 2, a flow chart of the operation of the originating mobile unit 10 is shown. The originating mobile unit 10 detects any user interaction with the handset indicating a call may be placed and remembers the phone activation activity, block 52. Such phone activation activities may include: selection of the phone book directory of the mobile unit, selecting a target caller to call, selecting the dispatch function in a menu of the originating mobile unit, opening the cover of the mobile unit or removal of the mobile device from its holster. If any of the aforementioned activities are detected, mobile unit 10 starts the channel scanning inactivity timer, block 54.

Next, block 56 determines whether the remaining battery life is greater than a predetermined low threshold value. If the remaining battery life is not greater than the low threshold, block 56 transfers control to block 58. Block 58 ends the scanning process and the normal non-scanning operation of the handset is resumed. This is done even if the user is going through the call selection menus, for example.

If the remaining battery life is greater than the low threshold, block 56 transfers control to block 60. Block 60 scans for the various messages necessary for a mobile unit to initiate a RF connection.

Next, block 62 determines whether the user of the mobile unit has selected a target mobile unit 20 or 30. If the originating mobile unit 10 determines that a target has been selected, block 62 transfers control to block 63. Block 63 sends the origination for selecting the target mobile unit to the network 40. It then places the originating mobile unit 10 in its normal operating mode for a mobile unit which is originating a call.

If the user of mobile unit 10 has not selected a target, block 62 transfers control to block 64 via the no path. Block 64 determines whether the scan inactivity timer has expired. If the scan inactivity timer has expired, block 64 transfers control to block 58 via the yes path. If the scan inactivity timer has not expired, block 64 transfer control to block 68 via the no path.

Block 68 determines whether the originating mobile unit has acquired all the RF acquisition messages. If all the various messages necessary for a mobile unit to initiate a RF connection have been acquired by the originating mobile unit, block 68 transfers control to block 70 via the yes path. If the originating mobile unit has not acquired all the various messages necessary for a mobile unit to initate a RF connection, block 68 transfers control to block 56 via the no path.

Block 70 determines whether the remaining battery life is greater than a high threshold. If the battery life is not greater than the high threshold, block 70 transfers control to block 56 via the no path and a speculative scan process 51 is repeated.

If block 70 determined that the remaining battery life was greater than the high threshold, block 70 transfers control to block 74 via the yes path. Block 74 determines whether the strength of the pilot signal for the particular cell is greater than a predetermined threshold or if the cell is unloaded through another measure. This indicates the loading of traffic within the particular cell. If the pilot strength is not greater than the threshold or the cell is determined to be loaded, block 74 transfers control to block 56 for a repetition of the speculative scanning loop 51.

If the pilot strength is greater than the threshold or the cell is determined to be unloaded, then block 74 transfers control to block 76 via the yes path. Block 76 sends the channel origination via the mobile link to the network 40 and starts the channel inactivity timer.

Next, block 78 determines whether the originating mobile unit 10 has selected a target mobile unit. If it has, block 78 transfers control to block 80 via the yes path. Block 80 sends the call origination information via the traffic channel. If the originating mobile unit has not selected a target, block 78 transfers control to block 82 via the no path. Block 82 determines whether the channel inactivity timer has expired. If the channel inactivity timer has expired, block 82 transfers control to block 84 which ends the process and the RF channel is dropped. If the channel inactivity timer has not expired, block 82 transfers control to block 78 and iterates the selection determination and channel inactivity timer determination until either a target is selected or the channel inactivity timer expires.

As can be seen from the above explanation, by assuring that the battery life is sufficient and initiating the scanning process for RF acquisition message as soon as the user of the originating mobile unit selects an activation function, the setup time may be substantially decreased. The time saved by early scanning may be one or more seconds. This time savings will enable the user to more quickly connect to target mobile units. In addition, this method will enable the success of such functions as push-to-talk dispatch calls. The scanning process has minimal impact on the battery life of the mobile unit.

Additionally, this approach avoids the RF capacity costs of speculative origination when the remaining RF capacity in the cell is below some threshold. This ensures that time saving method will not reduce the RF capacity available for other services for other mobiles such as voice and data. In cells that are under loaded, these RF resources are more likely to go to waste, and thus, speculating in these environments and not in the loaded cells improves the total benefits relative to the total costs of using this method.

In cells which are more loaded, the method also provides for limiting the use of this speculation to mobiles which are in particularly good RF locations, as indicated by the Ec/Io or pilot signal strength that they detect. A mobile unit in a good RF location will consume significantly less RF resources when it is active (on an RF channel) than will one in a bad RF location (i.e. with a poor Ec/Io).

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A dispatch call setup method for a dispatch call in a packet data network comprising the steps of:
   detecting, by an originating mobile unit, a phone activation function;
   determining, by the originating mobile unit, whether a battery life is greater than a low predetermined threshold;
   if the battery life is greater than the low predetermined threshold, scanning by the originating mobile unit for an RF acquisition message;
   determining, by the originating mobile unit, whether the RF acquisition message was received by the originating mobile unit; and
   if the RF acquisition message was not received, iterating the steps of determining whether the battery life is greater than the low predetermined threshold, scanning and determining whether the RF acquisition message was received.

2. The dispatch call setup method as claimed in claim 1, wherein there is further included a step of initiating a scan inactivity timer after the step of selecting a phone activation function.

3. The dispatch call setup method as claimed in claim 2, wherein there is further included a step of determining by the originating mobile unit whether a target mobile unit has been selected.

4. The dispatch call setup method as claimed in claim 3, wherein, if the originating mobile unit has selected a target mobile unit, there is further included the steps of:
   stopping the step of scanning for an RF acquisition message; and
   sending an origination to the packet data network.

5. The dispatch call setup method as claimed in claim 3, wherein, if the originating mobile unit has not selected a target mobile unit, there is further included the step of determining whether the scan inactivity timer has expired.

6. The dispatch call setup method as claimed in claim 5, wherein, if the scan inactivity timer has expired, there is further included a step of stopping the scanning for the RF acquisition message.

7. The dispatch call setup method as claimed in claim 5, wherein, if the RF acquisition message was received, there is further included a step of determining whether the battery life is greater than a high predetermined threshold.

8. The dispatch call setup method as claimed in claim 7, wherein, if the battery life is less than or equal to the high predetermined threshold, there is further included steps of determining, scanning, determining and iterating and of claims 2 through 7.

9. The dispatch call setup method as claimed in claim 7, wherein, if the battery life is greater than the high predetermined threshold, there is further included the steps of:
   determining whether a pilot strength for a cell is greater than a first threshold value or if the cell is unloaded; and
   if the pilot strength is less than or equal to the first predetermined value, then performing the steps determining, scanning, determining and iterating and of claims 2 through 8.

10. The dispatch call setup method as claimed in claim 9, wherein, if pilot strength is greater than a first threshold value or if the cell is unloaded, there is further included the steps of:
   sending an origination by the originating mobile unit to a network; and initiating a channel inactivity timer.

11. The dispatch call setup method as claimed in claim 10, wherein there is further included a step of determining whether the originating mobile unit has selected a target mobile unit.

12. The dispatch call setup method as claimed in claim 11, wherein, if the originating mobile unit has selected the target mobile unit, there is further included a step of sending an origination to a traffic channel of a network.

13. The dispatch call setup method as claimed in claim 11, wherein, if the originating mobile unit has not selected the target mobile unit, there is further included a step of determining whether the channel inactivity timer has expired.

14. The dispatch call setup method as claimed in claim 13, wherein, if the channel inactivity timer has expired, there is further included a step of dropping an RF channel coupling the originating mobile unit with a network.

15. The dispatch call setup method as claimed in claim 13, wherein, if the channel inactivity timer has not expired, there is further included a step of iterating the steps of:
- determining whether the originating mobile unit has selected a target mobile unit; and
- determining whether the channel inactivity timer has expired.

16. The dispatch call setup method as claimed in claim 1, wherein, if the battery life is less than or equal to the low predetermined threshold, there is further included the steps of:
- stopping the step of scanning for an RF acquisition message; and
- returning the originating mobile unit to a normal operation mode.

* * * * *